United States Patent [19]

Lecheheb

[11] Patent Number: 4,827,278

[45] Date of Patent: May 2, 1989

[54] CONTROL OF CONTINUOUS INK JET PRINTING SYSTEM

[75] Inventor: Ammar Lecheheb, Newmarket, England

[73] Assignee: Domino Printing Sciences PLC, Cambridge, England

[21] Appl. No.: 180,773

[22] Filed: Apr. 12, 1988

[30] Foreign Application Priority Data

Apr. 14, 1987 [GB] United Kingdom ................. 8708884

[51] Int. Cl.[4] ............................................ G01D 15/18

[52] U.S. Cl. ........................................ 346/1.1; 346/75; 346/140 R

[58] Field of Search ........................ 346/1.1, 75, 140 R

[56] References Cited

U.S. PATENT DOCUMENTS 4,555,712 11/1985 Arway et al. ........................ 346/75
4,628,329 12/1986 Regnault .............................. 346/75
4,651,161 3/1987 Rich et al. ........................... 346/1.1
4,658,268 4/1987 Needham ............................ 346/1.1

*Primary Examiner*—E. A. Goldberg
*Assistant Examiner*—Gerald E. Preston
*Attorney, Agent, or Firm*—Robbins & Laramie

[57] ABSTRACT

A method of and apparatus for controlling the velocity of a stream of droplets in a continuous ink jet printing system comprises controlling, from a system cabinet, the velocity of the stream expelled from the print head through a nozzle under pressure from a pressure source, in dependence upon a measured pressure of the ink in accordance with a predetermined relationship between the velocity and the pressure. On start up the system calibrates for the pressure differential $P_c$ due to the conduit length and the relative elevation of the print nozzle; and a determination of the ink viscosity in made at predetermined times. Thereafter the velocity is controlled in dependence upon a required pressure value $P_r$ in accordance with a stored look-up table, the required pressure value at any time being determined substantially by a given relationship.

6 Claims, 2 Drawing Sheets

CONTROL OF CONTINUOUS INK JET PRINTING SYSTEM

DESCRIPTION

Figure 1:
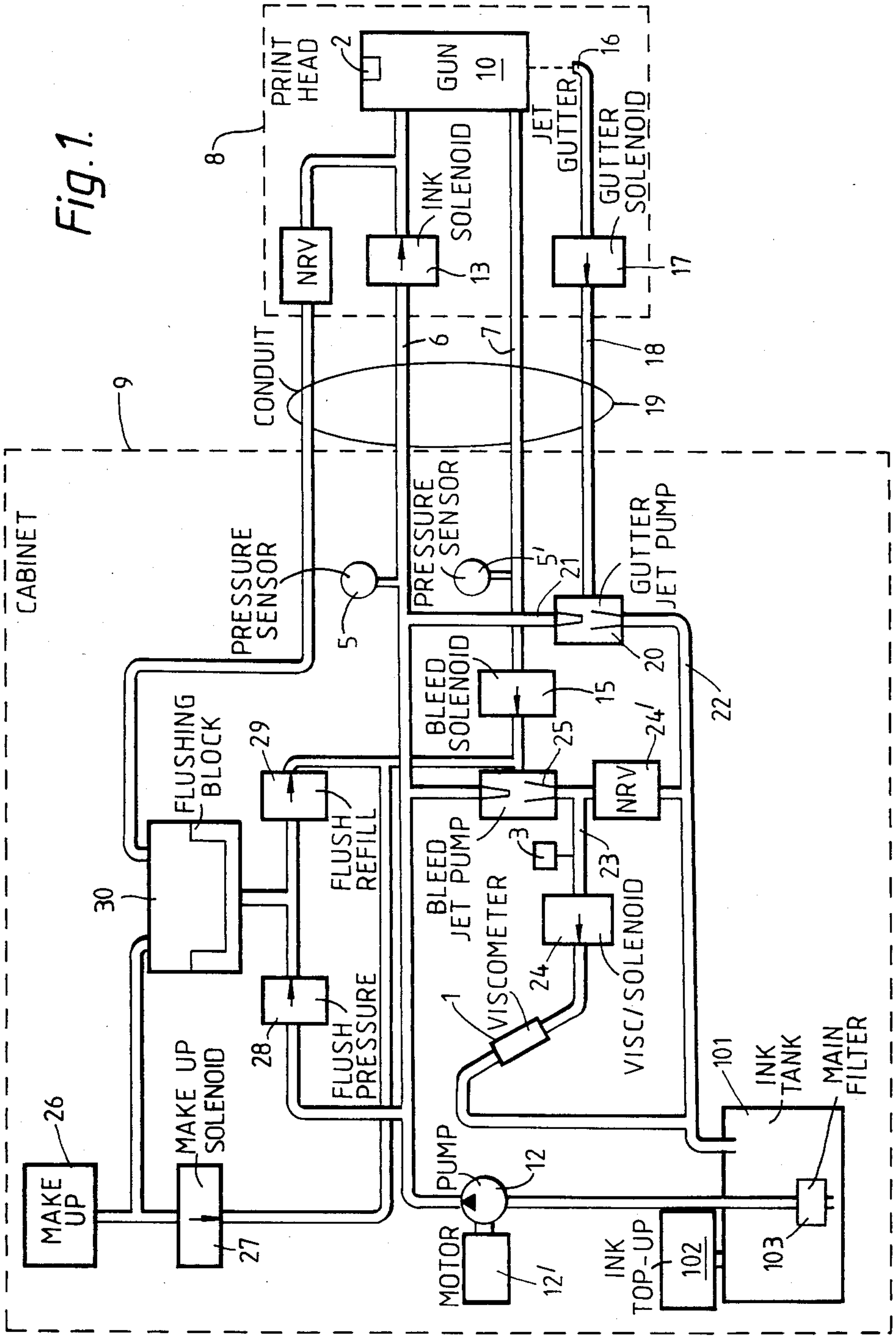

The present invention relates to continuous ink jet printing systems in which a stream of ink droplets are electrostatically charged and then deflected by passage between differentially charged plates. More particularly, the invention relates to a method of controlling the velocity of the droplets to be constant, in order to maintain accuracy of droplet placement.

In continuous ink jet printing systems it is generally accepted that droplet velocity is a critical factor affecting the accuracy of droplet placement on the substrate which is being printed and, accordingly, there have been various proposals for controlling droplet velocity. Such proposals generally fall into one of two categories. The first category relates to systems in which the velocity of the droplets is measured directly, for example, as described in U.S. Pat. No. 3,907,429, by an optical measuring system. U.S. Pat. No. 3,600,955 discloses a method which involves detecting the velocity between a droplet charging device and a phase detector located downstream of it, and U.S. Pat. No. 4,217,594 discloses forming a gap in the stream of droplets and detecting the velocity of the moving gap to determine droplet velocity. These prior art devices, which teach the use of electrodes or the like positioned along the droplet flight path and which measure directly the droplet time of flight from which the velocity is deduced, are successful in maintaining constant jet velocity, but they make the print head construction extremely complex. Furthermore, the setting up of the machine is difficult and time consuming as the electrodes and ink stream have to be positioned relatively to one another within very tight tolerances.

A second category of device utilizes an indirect method of determining stream velocity, for example, by sensing the pressure of ink within the system, for example as disclosed in GB-A-1408657. An empirical relationship between the ink pressure and the velocity is utilized to control the velocity for constancy by adjusting the supply pump to control the pressure. However, a source of error in such a system is that no account is taken of energy loss in the piping to the print head and in the nozzle itself and that temperature differences between the cabinet containing the pumping equipment and the print head are not taken into consideration. Similarly, the prior art does not take into account the length of the feed pipe nor the elevation of the print head.

Accordingly, there is a need for a method of controlling stream velocity to more accurately maintain the velocity constant, but without complicating the print head construction.

In accordance with the present invention therefore there is provided a method of controlling the velocity of a stream of droplets in a continuous ink jet printing system, the method comprising controlling, from a system cabinet, the velocity of the stream expelled from the print head through a nozzle under pressure from a pressure source, in dependence upon a measured pressure of the ink in accordance with a predetermined relationship between the velocity and the pressure, characterized by the steps of calibrating, on start up of the system, for the pressure differential $P_c$ due to the relative elevation of the print nozzle;

making a determination of the ink viscosity at predetermined times; and thereafter controlling the velocity in dependence upon a required pressure value $P_r$ in accordance with a stored look-up table, the required pressure value at any time being determined substantially by the relationship:

$$P_r = P_d + P_c \cdot \mu / \mu_i$$

where:

$P_d$ is the optimum desired supply pressure to maintain the desired velocity;

$\mu$ is the measured viscosity of the ink at that time;

$\mu_i$ is the measured viscosity of the ink on initial energization of the pressure source.

According to a first aspect of the invention the step of calibrating the system on start up comprises:

sensing the atmospheric pressure in the supply line to the nozzle before energization of the pressure source which pressurizes the ink in use, by means of a sensor in the supply line;

energizing the pressure source, closing a valve in the supply line downstream of the sensor and sensing a first supply pressure $P_1$;

opening the valve and sensing a second supply pressure $P_2$; and setting the calibration pressure $P_c$ equal to $P_1 - P_2$.

This has the added advantage of calibrating for frictional losses in the piping between the system cabinet and the printhead containing the nozzle.

According to a second aspect of the invention the step of calibrating the system on start up comprises:

energizing the pressure source, opening a valve in the supply line to the print head to allow ink to exit from the nozzle and to enter the bleed line from the print head;

closing a bleed line solenoid valve in the cabinet to cause the bleed line to fill and sensing a pressure $P_h$ by means of a sensor in the bleed line within the system cabinet; and setting the calibration pressure $P_c$ equal to $P_h$.

By situating the pressure sensor in the bleed line it is necessary only to compensate for print head elevation.

By means of such methods, changes in operating conditions can be sensed electronically and steps taken automatically to compensate for the resulting variations in droplet stream speed.

The invention also includes apparatus for carrying out the methods described above.

Figure 2:
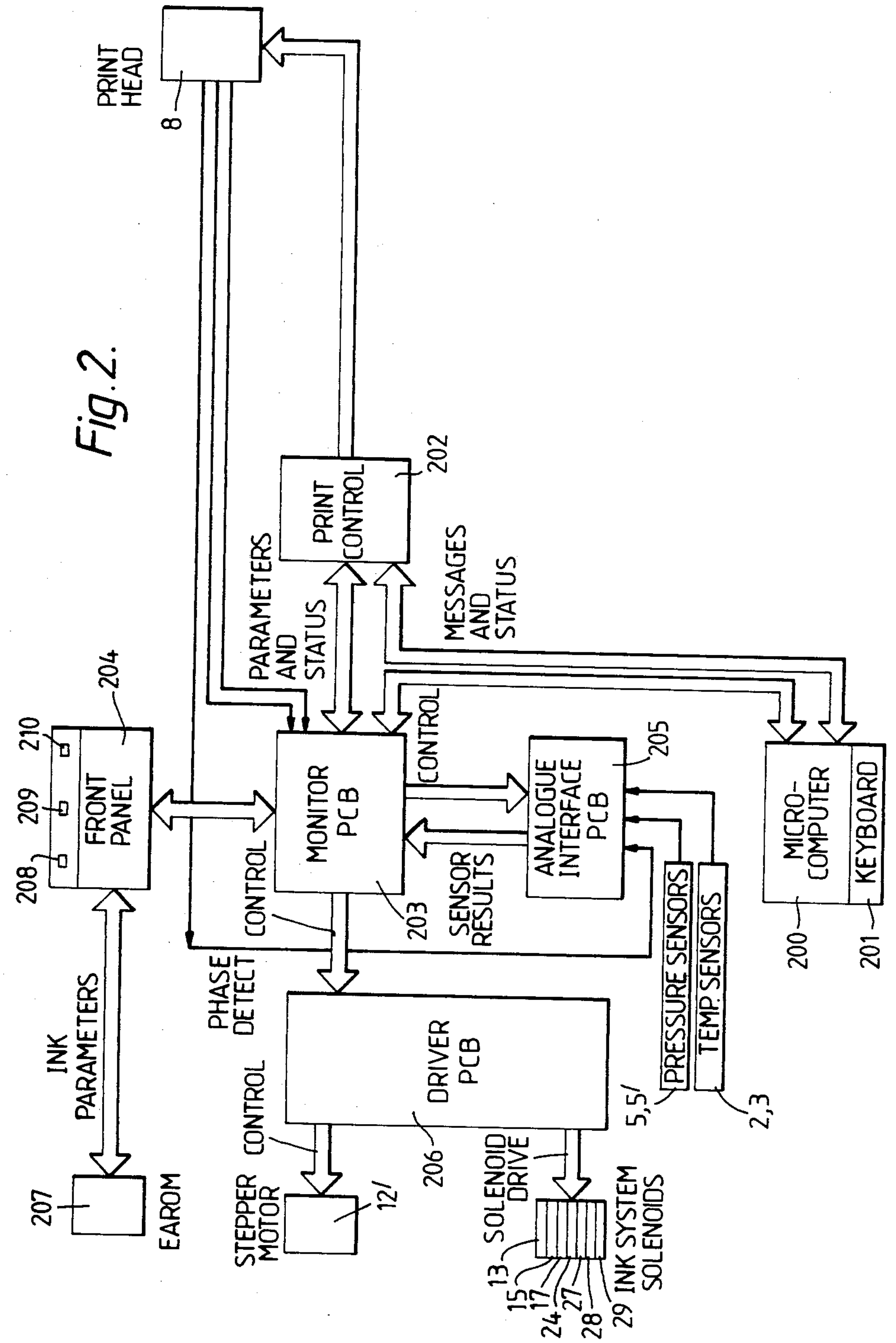

One example of a method and apparatus according to the present invention will now be described with reference to the accompanying drawings in which:

FIG. 1 is a block diagram of the ink system in a continuous ink jet printing apparatus; and, FIG. 2 is a block diagram of the electronic control system of the apparatus.

Viscosity is chosen to be measured in this example by means of a falling-ball viscometer 1 (as described in our EP-A-0142265, but, alternatively, viscosity could be determined as described in EP-A-0228828 (U.S. Ser. No. 940,094), the details of both of which are herein incorporated by reference thereto. In either case, a relationship which is dependent upon the operating temperature of the ink yields a value of viscosity by means of which, as described in our earlier applications, decisions are taken as to adjustment of ink solvent in order to maintain the desired viscosity. This maintains the desired concentration of ink.

Ink is supplied from a main reservoir or ink tank 101 to which top-up ink is fed when necessary for replenishment, by a replaceable in ink cartridge 102, and is fed through a filter 103 by means of a gear pump 12 driven by stepper motor 12'. From the pump 12 ink is fed through a supply line 6, which passes through a conduit 19 from the cabinet 9 to the print head 8, via an ink solenoid 13 to the ink gun or nozzle 10, from which ink is ejected in use. Ink droplets which are not printed are returned through a gutter/catcher 16 and, via a gutter solenoid 17, through a return line 18 (also in the conduit 19). The flow of ink in the return line 18 is caused, in this example, by a jet pump 20, the return flow constituting the secondary flow of the jet pump, and the primary flow in the jet pump being provided by a by-pass flow of pressurized ink from the supply line 6 through a by-pass line 21. Ink is returned from the jet pump 20 to the tank 101 through a line 22.

The viscometer 1 is located in a branch 23 off the line 22 so that viscosity measurements can be made of ink circulating in the system. A viscometer solenoid 24 controls flow through a non-return valve 24' and through the solenoid as described in EP-A-0142265 or EP-A-0228828. Further explanation of the operation of the viscometer is not considered to be necessary in the context of this invention.

A bleed solenoid 15 is provided in a bleed line 7 from the print head 8 in order to accomplish, primarily, bleeding of ink from the print head on start and shut-down of the apparatus. As with the return line 18, the motive force for the bled ink is provided by a bleed jet pump 25.

An ink solvent make-up cartridge 26 is used to supply solvent as required to maintain the desired viscosity, the solvent being supplied through solenoid 27. The ink system can be flushed through with solvent by means of operation of solenoid 27 and further solenoids 28 and 29, in conjunction with flushing block. The operation of these items forms no part of the present invention and will not therefore be further described.

FIG. 2 shows the electronic control system in simplified block diagram form.

A micro-computer 200 with integral keyboard 201 is used to input messages to be printed and to provide diagnostic and servicing functions in use, through a print control section 202, which controls printing of ink through the print head 8. These print control functions form no part of the present invention and will not be further described herein. Print control and ink system control are all monitored/controlled through a monitor circuit board 203 to which signals from the print control 202, the temperature sensors 2,3, pressure sensors 5 (or 5'), and a front panel circuit board 204 are fed.

The pressure and temperature signals are passed to the monitor PCB 203 via an analogue interface 205. Similarly, the interface 205 also received signals from a phase detector (not shown) which is conventional and which is located in the print head 8 to monitor charging of the droplets for printing. Again this forms no part of the present invention.

Control of the operation of the system by the monitor PCB 203 is further achieved through a driver PCB 206, which drives the stepper motor 12' and various solenoids 13,15,17,24,27,28,29 under instruction of the monitor PCB which is programmed as required to carry out the desired functions.

An EAROM 207 which is attached to the ink tank 101 provides data to the monitor relating to the type of ink therein, as will be further described.

The front panel 204 includes various control switches 208,209,210, together with indicators and other items which are not relevant to a description of the present invention.

In use, firstly, a main "electronics on" switch 208 is actuated which switches power from an external power source to the system electronics. Under program control from the monitor PCB 203, the pressure transducer 5 is read and a gauge pressure reading obtained and stored in the monitor PCB 203.

Thus, before the pump 12 is energized, and in order to provide an auto zeroing or first calibration step, the pressure from the pressure transducer 5 is sensed while the supply line 6 is vented to atmosphere by means of the opening of the solenoid valve 13. The outlet voltage from the transducer or sensor 5 is then utilized within the control system as a null point. In other words, the readings from the pressure transducer for atmospheric pressure are recorded to act as a reference point for subsequent readings. In this way errors to null offset, temperature null shift and long term instability in the transducer are zeroed out, auto zeroing taking place each time the system is started.

Recalibration of the pressure sensor or transducer 5 is easily, automatically and continuously performed on each start-up in order to maintain accuracy within the system.

Next, a "system on" switch is pressed to turn on the stepper motor 12', via the monitor PCB 203, to drive the pump 12 and the pump pressure is ramped to a predetermined constant pressure close to the nominal operating pressure. This is done to enable checks to be carried out to allow for possible movement of the print head 8 from one elevation to another, or to allow for changes in feed pipe size, shape and length having been made since the system was last operated. Checks are arranged to be carried out within the system before the jet of droplets is established and printing commences. In a conventional system this would normally be achieved by the provision of a pressure transducer at the print head which not only makes the print head bulky, but also complicates its construction and requires time consuming operations under operator control.

In the present example the checks are carried out in two stages. The "jet on" is then pressed and under software control of the monitor PCB 203 a desired system pressure is set by reference to the temperature sensed by temperature sensor 2 and a table of temperature and related pressure values is read from the EAROM 207. The table of values takes the form:

| Temperature | Pressure |
|---|---|
| $T_1$ | $P_1$ |
| $T_2$ | $P_2$ |
| — | — |
| — | — |
| $T_n$ | $P_n$ |

and represents a relationship between pressure and viscosity for the particular ink in use.

The set pressure value is stored. Again, under software control, the solenoid valve 13 is opened to allow the flow of ink through the gun or nozzle 10 and a second pressure reading $P_2$ is taken. The difference in pressure between $P_1$ and $P_2$ is a calibration pressure which is related to feed pipe size, shape and length, print head elevation and viscosity of the ink at the time of calibration.

The values of temperatures sensed by the transducer 2 in the print head 8 and the transducer 3 in the system cabinet 9 are used in the determination of the viscosity. Two values are sensed in order to provide for accurate viscosity determination, the two values being likely to differ due to the different locations of the cabinet and print head.

Once the pump 12 has been energized and the above calibration steps carried out, the pressure of ink to give the required jet velocity is automatically controlled thereafter to the optimum value (which is temperature dependent), the pressure being derived from the look-up table stored in the EAROM 207. This optimum pressure is constantly adjusted for errors outside a given tolerance band by monitoring pressure through the sensor 5 and temperature through the sensor 2, thus taking into account environmental changes, the system behaving, in use, according to the following equation:

$$P_r = P_d + (P_1 - P_2) \cdot \mu / \mu_i$$

where $P_d$ is the optimum desired supply pressure to maintain the desired velocity;

$\mu$ is the measured viscosity of the ink at that time;

$\mu_i$ is the measured viscosity of the ink on initial energization of the pressure source.

In an alternative method in which the pressure transducer 5' is situated in the bleed line rather than in the supply line the step of calibrating for the pressure differential due to the elevation of the print head 8 is carried out as follows under software control.

Firstly the pump 12 is energised and the feed solenoid valve 13 is opened to allow ink to pass through the gun or nozzle 10 and so that ink enters the bleed line 7 which returns unused ink from the print head 8, through a solenoid valve 15, within the cabinet 9, to the main ink supply system.

In normal use the bleed solenoid 15 is closed and, for calibration purposes, it is held closed so that a head of ink is allowed to build up in the bleed line 7. The feed solenoid valve is then closed and the pressure is then sensed by means of the transducer 5' so that a pressure corresponding to the hydrostatic pressure due to the elevation of the print head is determined. This calibration is carried out before the start of printing automatically, under the control of the control system. The sensor 5' thus determines a pressure $P_h$ corresponding to the elevation of the print head and this value $P_h$ is supplied as the calibration pressure $P_c$.

After calibration, the pressure of ink to give the required jet velocity is automatically set thereafter to the optimum value, the pressure, as described above, being derived from a look-up table stored in a EAROM for example. This optimum pressure is constantly adjusted taking into account environmental changes, the system behaving, in use, according to the following equation:

$$P_r = P_d + P \cdot \mu / \mu_1,$$

where $P_d$, $\mu$ and $\mu_i$ have the values previously described.

I claim:

1. In a method of controlling the velocity of a stream of droplets in a continuous ink jet printing system which comprises a print head having a nozzle from which an ink stream is jetted; an ink pressure source; a system cabinet, containing said pressure source; a control system for controlling the jetting of said stream from said nozzle, and conduit means connected between said cabinet and said print head;

which method includes the step of controlling, from said system cabinet, the velocity of said stream jetted from said nozzle in dependence upon a measured pressure of said ink in accordance with a predetermined relationship between the velocity of said stream and said ink pressure;

an improvement comprising the steps of calibrating, on start up of the system, for the pressure differential $P_c$ due to the length of said conduit and the elevation of the print nozzle relative said pressure source;

making a determination of the viscosity of said ink at predetermined times; and thereafter controlling the velocity of said stream in dependence upon a required pressure value $P_r$ in accordance with a stored look-up table, the required pressure value at any time being determined substantially by the relationship:

$$P_r = P_d + P_c \cdot \mu / \mu_i$$

where:

$P_d$ is the optimum desired supply pressure to maintain said desired velocity;

$\mu$ is the measured viscosity of said ink at that time;

$\mu_i$ is the measured viscosity of said ink on initial energization of said pressure source.

2. A method according to claim 1, wherein said conduit includes a supply line to said print head and said step of calibrating said system on start up comprises:

sensing the atmospheric pressure in said supply line before energization of said pressure source by means of a sensor in the supply line;

energizing the pressure source, closing said supply line downstream of said sensor (5) and sensing a first supply pressure $P_1$;

opening said supply line and sensing a second supply pressure $P_2$; and setting the calibration pressure $P_c$ equal to $P_1 - P_2$.

3. A method according to claim 1, wherein said conduit includes a supply line to and a bleed line from said print head and said step of calibrating the system on start up comprises:

energizing the pressure source, opening said supply line to allow ink to exit from said nozzle and to enter said bleed line;

closing said bleed line at a point within said cabinet to cause the bleed line to fill and sensing a pressure $P_h$ by means of a sensor in the bleed line within the system cabinet; and setting the calibration pressure $P_c$ equal to $P_h$.

4. A continuous ink jet printing apparatus which comprises a print head having a nozzle from which an ink stream is jetted; an ink pressure source; a system cabinet, containing said pressure source; a control means for controlling the jetting of said stream from said nozzle; and conduit means connected between said cabinet and said print head; wherein said control means is adapted to control the velocity of said stream in dependence upon a measured pressure of the ink in accordance with a predetermined relationship between the velocity and the pressure, said apparatus further comprising:

means for calibrating, on start up of the system, for the pressure differential $P_c$ due to the elevation of the print nozzle relative said pressure source;

viscosity determining means for providing a measure of the ink viscosity at predetermined times; and means for storing a set of required pressure values $P_r$ for different values of the droplet velocity; and means for controlling the velocity in dependence upon the required pressure value $P_r$, the required pressure value at any time being determined substantially by the relationship:

$$P_r = P_d + P_c \cdot \mu / \mu_i$$

where:

$P_d$ is the optimum desired supply pressure to maintain said desired velocity;

$\mu$ is the measured viscosity of said ink at that time;

$\mu_i$ is the measured viscosity of said ink on initial energization of said pressure source.

5. Apparatus according to claim 4, including:

a supply line to said print head;

means in the supply line for sensing the atmospheric pressure before energization of the pressure source;

means for energizing said pressure source;

means for opening and closing said supply line downstream of the sensor whereby said sensor means can sense a first supply pressure $P_1$ when said supply line is closed and a second supply pressure $P_2$ when said supply line is opened; and means for setting the calibration pressure $P_c$ equal to $P_1 - P_2$.

6. Apparatus according to claim 4, including:

a supply line to and a bleed line from said print head;

means for energizing the pressure source;

means for opening said supply line to the print head to allow ink to exit from the nozzle and to enter the bleed line;

means for closing said bleed line to cause said bleed line to fill;

a sensor in said bleed line within said system cabinet, for sensing a pressure $P_h$ in the bleed line when said bleed line is closed; and means for setting the calibration pressure $P_c$ equal to $P_h$.

* * * * *